(12) United States Patent
Reimann et al.

(10) Patent No.: US 11,381,953 B2
(45) Date of Patent: Jul. 5, 2022

(54) METHOD FOR VEHICLE-TO-VEHICLE COMMUNICATION

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE); Andreas Pfadler, Berlin (DE); Bernd Lehmann, Wolfsburg (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/211,894

(22) Filed: Mar. 25, 2021

(65) Prior Publication Data
US 2021/0306837 A1 Sep. 30, 2021

(30) Foreign Application Priority Data

Mar. 30, 2020 (EP) .................... 20166799

(51) Int. Cl.
*H04W 4/90* (2018.01)
*H04W 4/46* (2018.01)
(Continued)

(52) U.S. Cl.
CPC ............ *H04W 4/90* (2018.02); *H04W 4/021* (2013.01); *H04W 4/023* (2013.01); *H04W 4/025* (2013.01); *H04W 4/06* (2013.01); *H04W 4/46* (2018.02)

(58) Field of Classification Search
CPC ..... H04W 4/021; H04W 4/023; H04W 4/024; H04W 4/025; H04W 4/029; H04W 4/06;
(Continued)

(56) References Cited

U.S. PATENT DOCUMENTS

| 10,540,700 B1 * | 1/2020 | Chilukuri .............. H04W 4/021 |
| 10,719,084 B2 | 7/2020 | Yoon et al. |

(Continued)

FOREIGN PATENT DOCUMENTS

| CN | 110268163 A | 9/2019 |
| EP | 2901720 A1 | 8/2015 |
| KR | 20190030091 A | 3/2019 |

OTHER PUBLICATIONS

ETSI TS 102 637-3; Intelligent Transport Systems (ITS); Vehicular Communications; Basic Set of Applications; Part 3: Specifications of Decentralized Environmental Notification Basic Service; Apr. 2010; version 2.1.1.

(Continued)

*Primary Examiner* — Jean A Gelin
(74) *Attorney, Agent, or Firm* — Barnes & Thornburg, LLP

(57) ABSTRACT

A method of a first transportation vehicle for vehicle-to-vehicle (V2V) communication, which includes receiving a first message from a remote transmitter having first information on a hazard related to a first geolocation indicated in the first message; determining second information on a second transportation vehicle; and comparing the first information and the second information and selectively transmitting a forwarded message based on the content of the first message to the second transportation vehicle based on the comparison of the first and the second information.

23 Claims, 3 Drawing Sheets

(51) Int. Cl.
*H04W 4/021* (2018.01)
*H04W 4/02* (2018.01)
*H04W 4/06* (2009.01)

(58) Field of Classification Search
CPC ........... H04W 4/40; H04W 4/42; H04W 4/44; H04W 4/48; H04W 4/90
See application file for complete search history.

(56) References Cited

U.S. PATENT DOCUMENTS

| | | | |
|---|---|---|---|
| 10,883,502 B2 | 1/2021 | Moon et al. | |
| 2004/0102896 A1* | 5/2004 | Thayer | G08G 1/207 340/988 |
| 2004/0111301 A1* | 6/2004 | Wahlbin | G06Q 40/08 705/4 |
| 2005/0088318 A1* | 4/2005 | Liu | G08G 1/0965 340/995.13 |
| 2009/0037087 A1* | 2/2009 | Qi | G08G 1/092 701/117 |
| 2009/0291630 A1* | 11/2009 | Dunn | H04L 12/189 455/404.1 |
| 2011/0269480 A1* | 11/2011 | Fong | G08B 21/22 455/456.1 |
| 2012/0190295 A1* | 7/2012 | Kim | H04W 4/90 455/3.01 |
| 2013/0282271 A1 | 10/2013 | Rubin et al. | |
| 2014/0274225 A1* | 9/2014 | Lacatus | H04W 52/0261 455/574 |
| 2016/0023599 A1 | 1/2016 | Jo | |
| 2018/0224846 A1 | 8/2018 | Kovacs et al. | |
| 2019/0327618 A1 | 10/2019 | Li et al. | |
| 2020/0045517 A1* | 2/2020 | Park | H04W 4/029 |

OTHER PUBLICATIONS

Search Report for European Patent Application No. 20166799.5; dated Sep. 18, 2020.
Office Action for Korean Patent Application No. 10-2021-0041022; dated Dec. 7, 2021.

* cited by examiner

METHOD FOR VEHICLE-TO-VEHICLE COMMUNICATION

PRIORITY CLAIM

This patent application claims priority to European Patent Application No. 20166799.5, filed 30 Mar. 2020, the disclosure of which is incorporated herein by reference in its entirety.

SUMMARY

Illustrative embodiments relate to a method for selectively forwarding messages between transportation vehicles, particularly for selectively forwarding messages related to a hazard associated with an identified area. Illustrative embodiments further relate to a transportation vehicle configured for performing such method, particularly to a transportation vehicle comprising a control unit configured for performing such method and a computer program for enabling a computer to perform such method.

Illustrative embodiments provide an automatic transportation vehicle and method for operating the same.

BRIEF DESCRIPTION OF THE DRAWINGS

Disclosed embodiments are described in more detail with reference to the drawings, in which.

DETAILED DESCRIPTION

Figure 1:
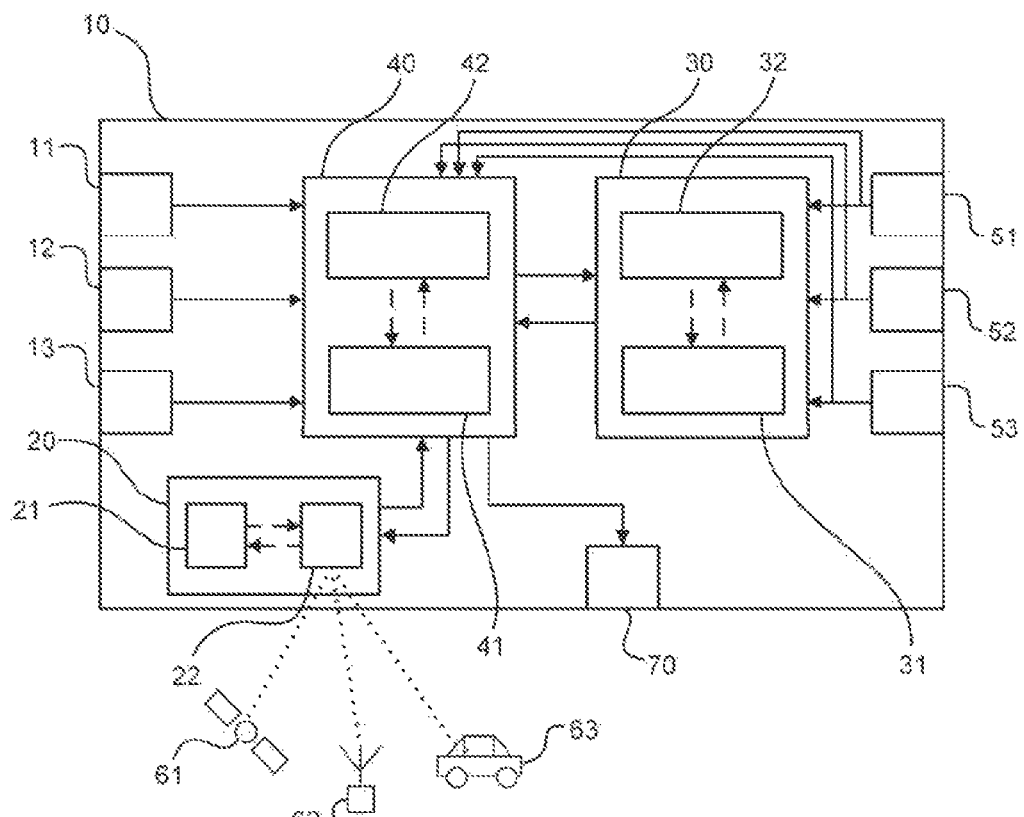
FIG. 1 schematically illustrates a transportation vehicle for performing the disclosed method.

Automotive applications and mobile communications have become more and more entangled, particularly due to the increasing interest in autonomous driving that requires larger amounts of data when compared to conventional driving. These data amounts are provided partially by the transportation vehicle itself (i.e., by sensors thereof) and partially via an air interface. Via the air interface either a vehicle-to-vehicle (V2V) communication or a vehicle-to-everything (V2X) communication is carried out, the latter including communication with road side units, RSUs.

Where V2X communication is carried out via a cellular mobile network, such as, e.g., a LTE or 5G communication network, it is referred to as cellular-V2X, C-V2X. The V2V and C-V2X communications can be carried out in a LTE or 5G network with sidelink carries at the PHY layer (PC5 sidelink) or based on WLAN communication according to IEEE 802.11p standard.

One of the drawbacks of the IEEE 802.11p is that it is a Dedicated Short Range Communication (DSRC) by its nature limited to short ranges. However, this standard is popular and it would be beneficial to apply measures that could increase coverage of messages provided using this communication system while not causing large data overhead.

With an increasing amount of modern transportation vehicles using V2V and V2X communication, the number of users of these communication protocols is on the rise. Due to the user numbers and increasingly complex applications, the amount of transmitted data will rise continuously. However, due to limited bandwidth and data rate the increase in data might come along with a deterioration of channel quality and thus quality of service, QoS, of communication links.

However, particularly with respect to autonomous driving, the QoS of the radio links might be directly related to congestion of communication links and as a result related to the safety of the automated processes and hence the driver's safety. Hence, limiting data throughput via the radio link is one of the challenges of V2V and V2X.

Further, in modern communication techniques, broadcasting is declining while unicast is becoming more popular with techniques such as beamforming. This also poses challenges to transmission optimization.

It is also clear that messages must be sent within communication networks while applying transmission optimization measures.

However, while on one hand there is an interest to utilize V2V communication to supplement V2X communication in that transportation vehicles might share information on network coverage etc., to facilitate QoS prediction and/or to schedule application critical data upload or download, on the other hand the benefit of such V2V sidelink communication is deteriorated, if the messaging related to such V2V communication would congest the radio channel itself.

It would also be beneficial to inform transportation vehicles about emergencies and dangerous spots/areas. Such systems are known in the art where, for example, modern transportation vehicle navigation systems communicate with an information center and display information on congested areas or accidents in the navigation system's graphical user interface. However, such systems do not use communication channels effectively and their response times are usually slow as they do not operate locally but via a central system.

Disclosed embodiments overcome or reduce at least some of the drawbacks of the prior art and provide a method for vehicle-to-vehicle communication that is suitable for reducing traffic on radio links that are utilized for V2X and V2V communication and at the same time provide reliable information on emergencies or hazards.

According to a first disclosed embodiment, a method for vehicle-to-vehicle, V2V communication is provided that enables a transportation vehicle to selectively forward (or otherwise disseminate, circulate or propagate) a received message concerning a hazard. The following operations are performed by a control unit of the transportation vehicle as well as by a communication module of the transportation vehicle, the latter may be under control of the control unit.

The disclosed method is applicable to a first transportation vehicle for vehicle-to-vehicle, V2V communication, wherein the method comprises: receiving, from a remote transmitter, a first message comprising first information on a hazard related to a first geolocation indicated in the first message; determining second information on a second transportation vehicle; and comparing the first information and the second information and selectively transmitting a forwarded message based on the content of the first message to the second transportation vehicle in accordance with the comparison of the first and the second information.

Information about dangerous or hazardous spots/areas is currently restricted to the communication range (broadcast) of the used technology, which is currently IEEE 802.11p. In addition to this range limitation, the broadcast of the information also leads to channel overload. The selective transmission of the method of the present disclosure allows to limit communication channel use when providing information on hazards over increases coverage areas.

In an exemplary embodiment, the remote transmitter may be embedded in a transportation vehicle, such as a police or ambulance vehicle or be a portable, optionally battery powered, transmitter such that it may be set up in any location when needed. Therefore there may exist cases where the hazard moves, i.e., changes, its geolocation, e.g., a moving ambulance transmitting a hazard signal.

Optionally, the forwarded message is based on the content of the first message. This means that in a simplest embodiment, the forwarded message is the same as the first message and in other words is a forwarded message. In other disclosed embodiments, the forwarded message may comprise a subset of the content of the first message (e.g., filtered content) or alternatively the forwarded message may comprise more information than provided by the first message (e.g., identification of the forwarding transportation vehicle or information that the forwarding transportation vehicle is a forwarder and not the transmitter identifying the origin of the hazard).

In at least one disclosed embodiment, the first message may be forwarded when a forwarding level criterion has been met. The forwarding level criterion may be initially set in the first message. Its purpose is to limit the area of forwarding.

The forwarding level criterion defines how many times a first message may be forwarded in a given forwarding chain, for example, Level 1 means that a first transportation vehicle may forward the first message to a second transportation vehicle, while Level 2 means that the second transportation vehicle may forward the already forwarded first message to a third transportation vehicle. Level 3 would correspondingly extend Level 2 and so on. When processing the first message, the forwarding transportation vehicle may identify a current forwarding level. This feature also allows to limit redundant transmissions and communication channel congestion is thereby limited.

Optionally, the geolocation refers to the latitude and longitude coordinates of a particular spatial location. The comparison of the first and the second information refers to comparison of geolocations. However, the comparison may also relate to a type of second transportation vehicle and a type of hazard. Most general, the comparison between the information on the second transportation vehicle and the information on the hazard comprised in the first message is carried out to determine, whether the information on the hazard is of any interest for the second transportation vehicle. The second information may thus also relate to a type or the second transportation vehicle, a direction of travel of the second transportation vehicle, a mission class of the second transportation vehicle (e.g., police car, ambulance car, firefighter truck), or the like.

The second information on the second transportation vehicle may be determined by the first transportation vehicle based on at least sensor value obtained by the first transportation vehicle. Optionally, the first transportation vehicle may determine a geolocation, distance and/or traveling direction of the second transportation vehicle using on-board sensors, e.g., in combination with a GPS reading or the like. Exemplarily, the first information might specify a hazard at a geolocation behind the first transportation vehicle (in traveling direction) and the first transportation vehicle might detect a second transportation vehicle in front of it, wherein the second transportation vehicle is travelling away from the first transportation vehicle, i.e., also from the hazard geolocation. Hence, the first transportation vehicle decides based on the comparison of the first and second information to not transmit the forwarded message to the second transportation vehicle.

Alternatively or additionally, the second information may be comprised in a second message received from the second transportation vehicle. Exemplarily, the second message may be a message occasionally or periodically received by the first transportation vehicle from surrounding other transportation vehicles via a V2V communication. Exemplarily, the second message may be a Coorperative Awareness Message, CAM, or might be based on such type of message. CAM messages usually comprise an identifier, a location and a current traveling direction of a transportation vehicle and these information might be used as second information in the method of the present disclosure.

The second information relates to a current geolocation of the second transportation vehicle (a second geolocation), the method further comprising the operations of: comparing the current geolocation with a broadcast radius of the remote transmitter; and transmitting the forwarded message if the current geolocation is outside the broadcast radius. The broadcast radius may also be considered a predetermined distance to the remote transmitter.

In at least one disclosed embodiment, the second geolocation is above a predetermined distance to the first geolocation. This feature is aimed at filtering transmissions of the forwarded message in case the second transportation vehicle may receive the first message by itself, i.e., is within a range in which the first message may be received. This reception (or a broadcast) range of the first message may be inferred from the technology used and/or signal parameters such as quality, strength. Alternatively, the reception range may be explicitly given by the first message or initial signal parameters such as quality, strength may be given for the receiver to estimate the reception range based on a comparison of the initial signal parameters with the received signal parameters.

In other words, the broadcast radius is determined based on: information transmitted by the remote transmitter in the first message, a predetermined information, and/or a signal strength of the first message determined by the first transportation vehicle.

For example, if the remote transmitter transmits the first message within a radius of 1000 m, the first transportation vehicle is 800 m away from the remote transmitter and detects the second transportation vehicle at a distance 1600 m from the transmitter, the first transportation vehicle is aware that the first message cannot be received by the second transportation vehicle (as 1600 m is significantly above the 1000 m) and may act on this finding by transmitting the forwarded message to the second transportation vehicle.

In an exemplary embodiment, when the second geolocation is above a predetermined distance to the first geolocation there may be present another condition called, for example, a maximum distance, to which the first message is allowed to be propagated, e.g., 5 km. This allows to limit message dissemination radius and therefore avoid redundant or unnecessary transmissions.

Optionally, if the second geolocation is below a predetermined distance (or otherwise within the broadcast radius) to the first geolocation the method is refraining from the selective transmission of the forwarded message. Thereby redundant transmissions are avoided and communication channel congestion is limited.

In another example, the first message may comprise a version number to allow recipients determine whether a version has changed, which may indicate an update of the first message. This facilitates avoiding redundancy of messages on a radio communication channel and thus useless channel load by resending already shared information. The first transportation vehicle may choose to refrain from transmitting a forwarded message to the second transportation vehicle, e.g., from forwarding the first message to the second transportation vehicle, when a prior version of the first message has been forwarded to the second transportation vehicle and the version number of the first message has not changed.

Optionally, the first information further comprises an identification of time associated with the hazard. Such associated time may be a time of transmission of the first information when the hazard was still present. This helps receivers to identify whether the received messages are current, i.e., how much time has elapsed from message transmission to its reception. Further, the time parameter may also identify estimated removal time of a cause of the hazard.

In an exemplary embodiment, a transportation vehicle may refrain from propagating the first message when a predefined threshold time has elapsed from the reception of the first message. As an example, a transportation vehicle has received the first message, drives outside of the coverage range of the radio transmitter, from which the first message originates and stops for 10 minutes. After that the transportation vehicle continues driving and encounters a second transportation vehicle. Because, more than 10 minutes have passed (a time threshold for propagation, which may be different), the transportation vehicle may refrain from propagating the first message to the second transportation vehicle.

In other words, the method further comprises the operations of: comparing a current time with the identified time and transmitting the forwarded message if a difference between the current time and the identified time is less than a certain threshold.

Optionally, the first information further comprises an identification of a type of the hazard. Such information may be useful for occupants of transportation vehicles receiving this information. The identification may be, for example, displayed by a navigation system of a transportation vehicle. Such type of the hazard may be explicitly given by providing a description or may be given as a reference identifier to a look-up table of different types of hazards.

In some cases, based on the type of the hazard and the second information (e.g., vehicle type) it may be determined whether the hazard affects the second transportation vehicle (i.e., strong winds affecting transportation vehicles with trailers or busses). If it does, the forwarded message may be transmitted to the second transportation vehicle, while if it does not, the transmission may be omitted. Thereby redundant or unnecessary transmissions are avoided and communication channel congestion is limited.

In an exemplary embodiment the first information designates a relevant area of the hazard. This feature is useful, as a definition by a geolocation may not be sufficient in case of hazards of a larger scale, for example, a construction site on a lane of a road, which closes the lane over a distance of 1 km.

In such a case the relevant area may be defined, for example, as a polygon, vertices of which have different geolocations.

In another disclosed embodiment, the aforementioned relevant area is defined by identifying a radius from the first geolocation, which provides a simple way of defining the area.

Other options of defining the relevant area are such that the relevant area identifies a lane of a road or the relevant area (or the first message in general) identifies a direction of movement (e.g., a traffic movement direction in the area of the hazard), which is affected by the hazard. In some cases one of multiple lanes may be affected in a given direction while in other cases all lanes of a given direction (i.e., traffic movement direction at the hazard area) may be affected by a hazard. This first information is useful for the comparison with the second information regarding the second transportation vehicle. Above that such first information is useful for finding an appropriate response to the hazard by the first and/or second transportation vehicle. Exemplarily, based on the defined lane/direction, the first transportation vehicle may determine that the second transportation vehicle does not travel on such lane/in such direction and hence does not need to receive the forwarded message. Further, the first transportation vehicle may use the defined lane/direction when considering an alternative route for avoiding the hazard, e.g., if it is possible to circumvent that lane or not.

Optionally, the first message identifies a type of road to which the hazard relates. This feature addresses, for example, roads running next to each other. In such a case one road may be designated to avoid confusion. This first information is useful for the comparison with the second information regarding the second transportation vehicle. Above that such first information is useful for finding an appropriate response to the hazard by the first and/or second transportation vehicle. Exemplarily, based on the type of the road, the first transportation vehicle may determine that the second transportation vehicle does not travel on such type of road and thus does not need to receive the forwarded message. Further, the first transportation vehicle may use the defined road when considering an alternative route for avoiding the hazard, e.g., if there is an alternative for that type of road or not.

In another disclosed embodiment, the first message comprises an identifier of a road to which the hazard relates. This may allow to address vertically arranged roads, i.e., one over another. In such a case one of the roads may be designated while the other road remains unaffected by the hazard. Further, such identifier may simplify identifying the road in a data set stored in a navigation system of the first or second transportation vehicle. Above that, such identifier may be used in the comparison as well as for finding an appropriate response.

In an exemplary embodiment, the second message is transmitted only if the second transportation vehicle is moving towards the first geolocation.

In other words, the method further comprises the operations of: comparing an expected geolocation of the second transportation vehicle with the first geolocation; and transmitting the forwarded message if the expected geolocation is within a predefined radius around the first geolocation.

Exemplarily, a determination whether the second transportation vehicle is moving towards the first geolocation is made based on a route information received from the second transportation vehicle, e.g., based on route information from a navigation system of the second transportation vehicle comprising information on a start and an end point of a route and on a plurality of manoeuvres to be performed by the second transportation vehicle for traveling from the start to the end point along a predetermined grid of lineaments representing roads or parts of roads on a map.

Alternatively, the second message comprises information on the expected geolocation, i.e., the determination of the future whereabouts is performed and transmitted by the second transportation vehicle. The expected geolocations may be assigned a future timestamp and may be transmitted in a standardized form by the second transportation vehicle, e.g., as a part of a CAM message. Also, the second transportation vehicle may transmit information on the current geolocation and a current direction of the second transportation vehicle such that the first transportation vehicle can determine the expected geolocation(s) of the second transportation vehicle itself.

These options allow refraining from the selective transmission of the second message in case the second transportation vehicle will not arrive at (or in predefined proximity to) the geolocation of the relevant hazard. Thereby redundant or unnecessary transmissions are further avoided and communication channel congestion is limited.

It will be evident to a person skilled in the art that the various embodiments mentioned in this application can be beneficially combined with one another, unless otherwise stated in the individual case.

A further disclosed embodiment relates to a transportation vehicle, comprising a communication module configured to communicate with another transportation vehicle and with a remote transmitter; and a control unit configured to: receive, from the remote transmitter, a first message comprising first information on a hazard related to a first geolocation indicated in the first message; determine second information on a second transportation vehicle and compare the first information and the second information and selectively transmit a forwarded message based on the content of the first message to the second transportation vehicle in accordance with the comparison of the first and the second information. Illustrative embodiments of the transportation vehicle, e.g., with respect to the determination of the second information on the second transportation vehicle, correspond to the embodiments as described for above method.

Another disclosed embodiment relates to a computer program comprising instructions which, when the program is executed by a control unit of a transportation vehicle, cause the control unit to carry out a method of a first transportation vehicle for V2V communication as set forth above and/or to carry out a method of a second transportation vehicle for V2V communication as set forth above.

Additionally, disclosed embodiments provide a computer readable medium storing computer-executable instructions performing all the operations of the computer-implemented method according the method disclosed herein when executed on a computer.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

An example of a non-transitory medium is a non-volatile memory, for example, a flash memory while an example of a volatile memory is RAM.

Reference will now be made in detail to embodiments which are illustrated in the drawings. Effects and features of the exemplary embodiments will be described with reference to the accompanying drawings. Therein, like reference numerals denote like elements, and redundant descriptions are omitted. The present disclosure, however, may be embodied in various different forms, and should not be construed as being limited to only the illustrated embodiments herein. Rather, these disclosed embodiments are provided solely as examples for fully conveying the features of the disclosed embodiments to those skilled in the art.

Accordingly, processes, elements, and techniques that are not considered necessary to those having ordinary skill in the art for a complete understanding of the features of the disclosed embodiments may not be described. At the same time, within the drawings, the relative sizes of elements, layers, and regions may be exaggerated for clarity.

As used herein, the term "and/or" includes any and all combinations of one or more of the associated listed items. Further, the use of "may" when describing exemplary embodiments refers to "one or more exemplary embodiments of the present disclosure." Further, in the following description of exemplary embodiments, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items and expressions such as "at least one of" when preceding a list of elements, modify the entire list of elements.

As used herein, term as "substantially", and "about" are used as terms of approximation and not as terms of degree, and are intended to account for the inherent deviations in measured or calculated values that would be recognized by those of ordinary skill in the art. However, if the term "substantially" is used in combination with a feature expressed using a numeric value, the term "substantially" denotes a range of +/−5% of the value centered on the value.

FIG. 1 schematically illustrates an exemplary transportation vehicle 10, particularly a transportation vehicle with a combustion, electric or hybrid motor. The transportation vehicle 10 may be an automatic or a conventional transportation vehicle as long as it supports V2V communication.

An automatic transportation vehicle may comprise a multiple primary sensors, particularly a first sensor 11, a second sensor 12, and a third sensor 13. The primary sensors 11, 12, 13 are configured for detecting environmental information of the transportation vehicle and comprise, e.g., a camera for detecting images of a road upfront the transportation vehicle 10, distance sensors, such as, e.g., ultrasound-based sensors or LIDAR-based sensors, etc. The primary sensors 11, 12, 13 transmit the detected signals to a control unit 40 of the transportation vehicle 10.

The transportation vehicle 10 further comprises a plurality of secondary sensors, particularly a fourth sensor 51, a fifth sensor 52, and a sixth sensor 53. The secondary sensors 51, 52, 53 are configured for detecting information regarding the transportation vehicle 10 itself, particularly data regarding an actual position and motion state of the transportation vehicle 10. The secondary sensors 51, 52, 53 thus may comprise velocity sensors, acceleration sensors, tilt sensors, or the like. The secondary signals transmit the detected signals to the control unit 40 of the transportation vehicle 10.

The transportation vehicle 10 further comprises a communication module 20 with a memory and one or more transponders 22. The transponders 22 might be configured as radio, WLAN, GPS and/or BLUETOOTH® transponder or the like. The transponder 22 communicates with an internal memory 21 of the communication module, optionally via a suitable data bus. The communication module 20 is configured to perform V2V and (C-)V2X communication. The communication module 20 also communicates with the control unit 40. The communication module 20 is adapted for communicating messages according to the WLAN p communication system (IEEE 802.11p) and/or according to a LTE-V mode 4 communication system.

The transportation vehicle 10 further comprises a driving system 30 that is configured for performing fully or partially autonomous driving of the transportation vehicle 10, particularly for longitudinal and lateral control thereof. The driving system 30 comprises a navigation module 32 that is configured to determine a navigation route between a starting point and an end point input by a user. The driving system further comprises an internal memory 31, e.g., for map material, that communicates with the navigation module 32, e.g., via a suitable data bus. At least part of the secondary sensors 51, 52, 53 transmit their signals directly to the driving system 30, particularly including the actual position and movement information of the transportation vehicle 10.

The transportation vehicle further comprises a control unit 40 that is configured for performing the exemplary method as set forth in detail below. For performing this task and others the control unit 40 comprises an internal memory 41 and a CPU 42 that communicate with each other via a suitable data bus. Above that the control unit communicates with at least the primary sensors 11, 12, 13, the secondary sensors 51, 52, 53, the communication module 20 and the driving system 30, e.g., via one or more CAN, SPI, or other suitable connections.

Figure 2:
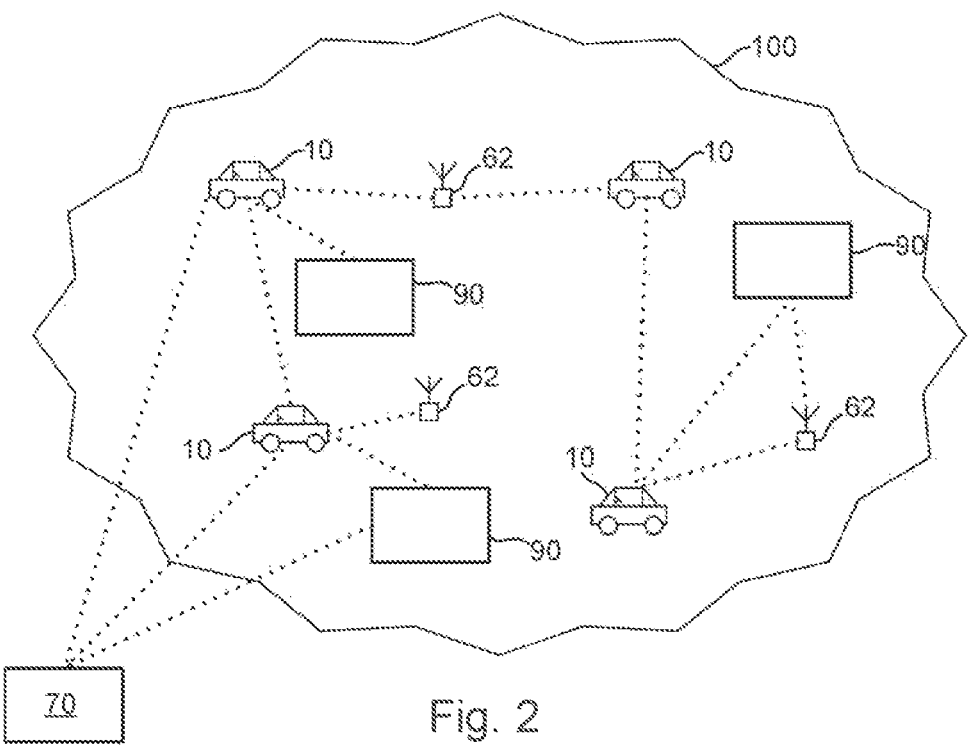
FIG. 2 schematically illustrates a smart environment for performing the disclosed method comprising the transportation vehicle of FIG. 1, base stations of a mobile communication network, and road side units (RSUs)

FIG. 2 schematically illustrates a smart environment for performing the disclosed method comprising transportation vehicles as of FIG. 1, base stations 62 of a mobile communication network and a server 70 and road side units, RSUs, 90 operated by a transportation vehicle manufacturer.

In the system as shown in FIG. 2 communication, i.e., transmission, reception or both, takes place among transportation vehicles 10 directly and/or between transportation vehicles 10 and a network component, particularly a base station 62, a road side unit 90, and/or an application or back end server 70. The communication thus either utilizes a mobile communication system or vehicle-to-vehicle, V2V, communication. Therein, the base stations 62 are usually operated by a network operator of a mobile communication network while the road side units 90 might be operated by a transportation vehicle manufacturer or a service partner thereof. Further, the road side units 90 communicate with the server 70 that can also communicate directly with transportation vehicles 10.

The mobile communication system used for the V2V and/or the V2X communication may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G) and may use mm-wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Figure 3:
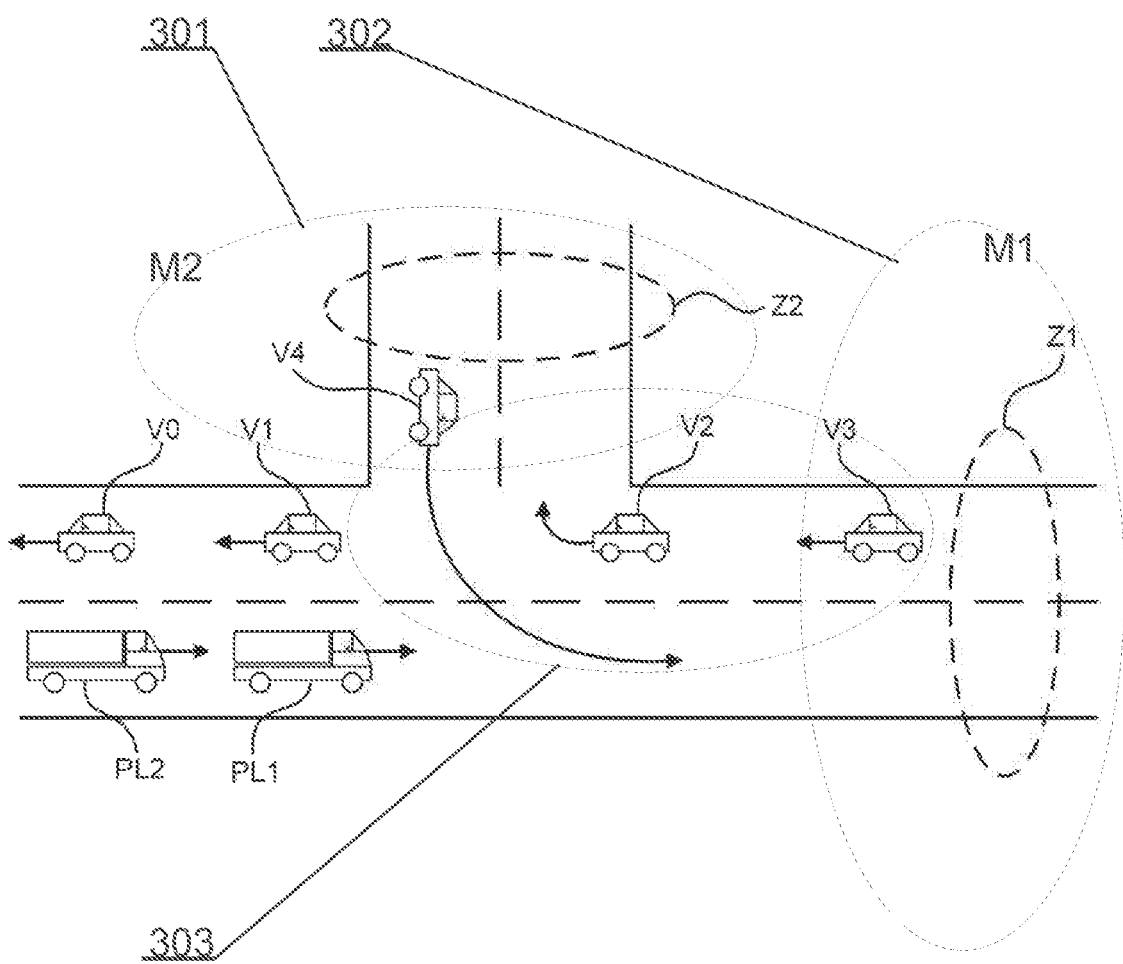
FIG. 3 illustrates an application case of the disclosed methods.

FIG. 3 illustrates an application case of a disclosed method, particularly of a method for V2V communication according to an exemplary embodiment.

According to the illustrated embodiment, two critical areas Z1 and Z2 exist along a road network, wherein in each of the critical areas a hazardous situation may have occurred.

The hazardous situation particularly refers to an accident. Other causes may be a flooded road, a tree fallen on the road, road construction works, painting work related to road markings, an emergency transportation vehicle moving in response to an emergency call (e.g., disobeying traffic rules which may result in hazardous situations).

In such cases a transmitter of a radio message may be set up to transmit a radio message comprising information on a hazard related to a first geolocation (identified according to a suitable system such as GPS (Global Positioning System) and/or GLONASS). However, such radio message may also be transmitted by a transportation vehicle passing or even crossing the first geolocation or by a RSU located nearby the first geolocation. The word geolocation may refer to the latitude and the longitude coordinates of a particular spatial location.

Such transmitters may be embedded in transportation vehicles such as police, ambulance, fire trucks or the like and be selectively activated. Alternatively, such a transmitter may be portable so that, for example, trained, uniformed services' staff may arrive at a location with such a transmitter and set it up in any location as it may be battery powered.

In the disclosed embodiment of FIG. 3, transportation vehicles V0, V1, V2, V3 and V4 are transportation vehicles 10, 62 that are configured for V2X and/or for V2V communication. Particularly, each of the transportation vehicles V0, V1, V2, V3 and V4 is a transportation vehicle according to an exemplary embodiment.

Further, the transportation vehicles PL2, PL1 are trucks which are organized in a platoon and which are also configured for V2X communication. Also trucks PL2, PL1 might be configured as exemplary transportation vehicles.

According to the illustrated embodiment, each of the transportation vehicles V0, V1, V2 and V3 has driven through a critical area Z1 in which a hazardous situation has occurred. A center of such zone may be considered a geolocation where the hazard has occurred.

In FIG. 3 a message M1 comprising information on a hazard related to a first geolocation Z1 is receivable within an area 302. Correspondingly, a message M2 comprising information on a hazard related to a second geolocation Z2 is receivable within an area 301.

In at least one disclosed embodiment, the M1, M2 messages may indicate whether they come from a source transmitter (the origin of the message). When such messages are forwarded or otherwise propagated, this indication will not be present.

Therefore only transportation vehicle V3 may receive the M1 message comprising information on a hazard related to a first geolocation Z1 while only transportation vehicle V4 may receive the M2 message comprising information on a hazard related to a second geolocation Z2.

Both V3 and V4 receive awareness messages from V2, which provides awareness messages within range 303 but cannot receive messages comprising information on a hazard related to the first geolocation Z1 or messages comprising information on a hazard related to the second geolocation Z2 as it is not within the range 301 or 302.

In such a case, either V3 or V4 or both may determine whether it is beneficial to inform the transportation vehicle V2 about the hazard related to the first geolocation Z1 and/or the hazard related to the second geolocation Z2.

The fact of being beneficial depends on different conditions as explained herein. It is not beneficial to, for example, forward all emergency/hazard related messages which a given transportation vehicle receives as it would create data chaos and a lot of redundant data transmissions, especially in heavy traffic areas and even more so in case of unicasting-based transmission systems.

The V3 and V4 may be aware of a geolocation of V2 (as provided by the V2) and are aware or may otherwise infer that V2 cannot receive the M1 and M2 messages.

In other words, the geolocation of V2 is above a predetermined distance threshold to the first geolocation where a hazard has occurred.

Such threshold may be predefined as a distance. For example, a transportation vehicle may be aware that messages such as M1 are transmitted with a radius of 500 m and when it determines (e.g., V3) that a geolocation of, for example, V2 is beyond that threshold, e.g., 800 m, V3 may consider informing V2 about M1.

Otherwise (not shown in FIG. 3), if the second geolocation (e.g., V2) is below a predetermined distance to the first geolocation (e.g., center of Z1) the V3 may refrain from the selective transmission of the M1 to V2. This is because transmitting M1 would be redundant as the V2 may receive it by itself or may have already received it.

Other factors influencing a decision whether to transmit messages such as M1 or M2 to another transportation vehicle by a first transportation vehicle may comprise a determination whether the another transportation vehicle is moving towards the first geolocation, i.e., geolocation of a hazard zone. The determination whether the another transportation vehicle is moving towards the first geolocation may be made based on a route information received from the another transportation vehicle.

In case of FIG. 3, the transportation vehicle V2 may be notified by the transportation vehicle V4 about the message M2 while transportation vehicle V2 will not be notified by V3 about the M1 message because the transportation vehicle V2 has passed the hazard zone Z1 and moves away from it. Thereby, the number of data transmissions may be reduced.

The M1, M2 messages may comprise an identification of time of their transmission. This allows the receivers to determine whether they are in possession of current messages (for example, the receivers may be aware of a frequency of transmission of such messages). Messages that are not current may be omitted when considering their propagation.

The M1, M2 messages may comprise an identification of a type of the hazard. Such hazard type may be explicitly given by providing a description or may be given as a reference identifier to a look-up table of different types of hazards.

According to the illustration of FIG. 3, also transportation vehicles PL1 and PL2 may receive propagated versions of the messages M1, M2 from transportation vehicles such as V1 and, based on a determination carried out at least by platoon leader PL1 that an intended route of the platoon will cross a critical area Z1, Z2, will consider the M1, M2 message. Further, transportation vehicle PL1 may adapt the platooning application parameters utilized in the platoon at least by transportation vehicle PL2, e.g., by increasing the distance or speed to be kept by transportation vehicle PL2 with respect to transportation vehicle PL1 to account for an incoming hazard.

Further, the transportation vehicles PL1 and PL2, particularly platoon leader PL2, will prompt further transportation vehicles V2, V3 coming into a transmission range of transportation vehicles PL1 and PL2 about M1, M2 in case it considers that to be beneficial as described above.

Figure 4A:
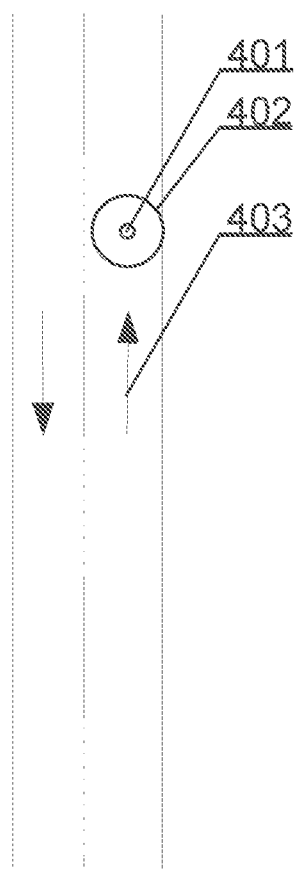
FIG. 4A depicts a first definition of a hazard.
Figure 4B:
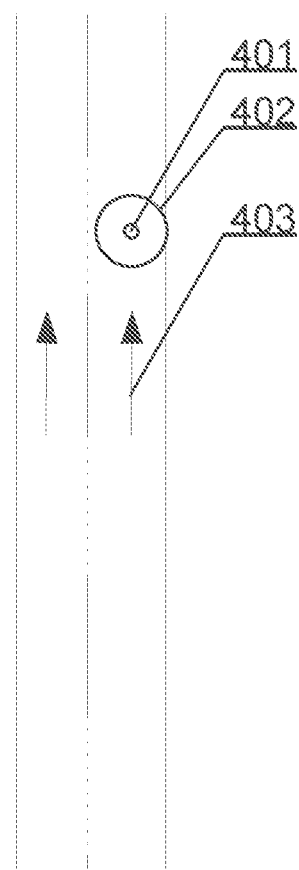
FIG. 4B depicts a second definition of a hazard.
Figure 4C:
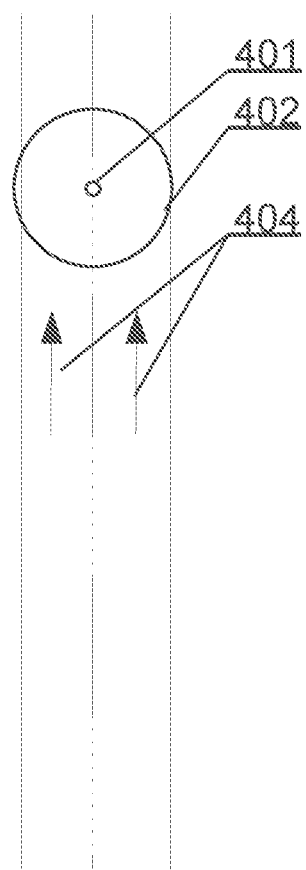
FIG. 4C depicts a third definition of a hazard.

FIGS. 4A-C depict different definitions of hazards. Depending on particular physical conditions, hazards may affect different geospatial areas, which may be called relevant area(s) of the hazard.

In an example of FIG. 4A such a relevant area is defined as a radius from the first geolocation, i.e., a center 401 of a zone 402, a particular focus point 401 of the hazard. On another occasion the relevant area identifies a direction of movement 403. To this end a hazard may be found to be associated only with a particular section of a road so that it affects only transportation vehicles moving from a first direction towards a second direction (e.g., driving north) and the hazard does not apply when moving from the second direction towards the first direction (e.g., driving south on the same road).

In an example of FIG. 4B the relevant area identifies a lane of a road. In this example a road has two lanes in one direction while only the right lane is affected by a hazard 402.

In case of FIG. 4C a directional information is combined with a plurality of lanes as the hazard 402 affects both lanes.

For example, a radio message comprising information on a hazard may comprise:

Geolocation of the hazard 401;
Radius of the affected area 402;
Driving direction affected 403;
Lanes affected, e.g., all lanes 404 or selected lanes from a plurality of lanes.

In another example, the relevant area identifies a type of road to which the hazard relates. This option addresses, for example, roads running next to each other, one of which is designated to avoid confusion. Such a case may allow excluding a secondary road from being affected by the hazard when the hazardous incident is present on a highway running nearby or next to the secondary road.

Optionally, the relevant area comprises an identifier of a road to which the hazard relates. This allows to address vertically arranged roads having a common geolocation. In such cases roads may be differentiated by providing an identifier of a road. Also, such an identifier may simplify the processing of the received information in the navigation system of the first or second transportation vehicle.

The electronic or electric devices and/or any other relevant devices or components according to exemplary embodiments described herein, except those described explicitly as hardware, may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips.

Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may comprise metallization, e.g., surface metallizations and/or pins, and/or may comprise conductive polymers or ceramics. Further electrical energy might be transmitted via wireless connections, e.g., using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

A person of skill in the art should recognize that the functionality of various computing devices may be combined or integrated into a single computing device, or the functionality of a particular computing device may be distributed across one or more other computing devices without departing from the scope of the exemplary embodiments. Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly defined so.

REFERENCE SIGNS 10 transportation vehicle
11 first sensor
12 second sensor
13 third sensor
20 communication module
21 memory
22 transceiver
30 driving system
31 memory
32 CPU
40 control unit
41 memory
42 CPU
51 fourth sensor
52 fifth sensor
53 sixth sensor
61 GPS satellite
62 base station
63 other transportation vehicle
70 backend server
90 road side unit
301 area within which M2 is receivable
302 area within which M1 is receivable
303 area of V2 awareness messages
401 Geolocation of a hazard
402 Radius of an affected area
403 Driving direction affected
404 Lanes affected
M1, M2 messages related to hazards
V0, V1, V2, V3, V4 passenger transportation vehicles
PL1, PL2 platoon transportation vehicles

The invention claimed is:

1. A transportation vehicle comprising:
a communication module to communicate with another transportation vehicle and with a remote transmitter; and
a control unit configured to:
receive a first message from the remote transmitter comprising first information on a hazard related to a first geolocation indicated in the first message, the first information designating a relevant area associated with the hazard, wherein the relevant area is defined based on one or more lanes affected by the hazard and a type of road associated with the one or more lanes;
determine second information on a second transportation vehicle;
compare the first information and the second information; and
selectively transmit, to the second transportation vehicle and based on the comparison of the first and the second information, a forwarded message based on the content of the first message;
wherein the second information relates to a current geolocation of the second transportation vehicle,
the control unit being further configured to:
compare the current geolocation with a broadcast radius of the remote transmitter; and
transmit the forwarded message in response to the current geolocation being outside the broadcast radius.

2. The transportation vehicle of claim 1, wherein the second information on the second transportation vehicle are determined based on at least sensor value obtained by the first transportation vehicle, or comprises in a second message received from the second transportation vehicle.

3. The transportation vehicle of claim 1, wherein the broadcast radius is determined based on:
information transmitted by the remote transmitter in the first message;
a predetermined information; or
a signal strength of the first message determined by the first transportation vehicle.

4. The transportation vehicle of claim 1, wherein the method further comprises, in response to the current geolocation being within the broadcast radius, refraining from the selective transmission of the forwarded message.

5. The transportation vehicle of claim 1, wherein the first information further comprises an identification of time associated with the hazard, and the method further comprises:
comparing a current time with the identified time; and
transmitting the forwarded message in response to a difference between the current time and the identified time being less than a certain threshold.

6. The transportation vehicle of claim 1, wherein the first information includes an identification of a category of the hazard, and the method further comprises:

comparing a category of hazard with the second information; and transmitting the forwarded message in response to the category of hazard affecting the second transportation vehicle.

7. The method of claim 1, wherein the relevant area is defined by a radius from the first geolocation.

8. The transportation vehicle of claim 1, wherein the first information identifies a direction of movement.

9. The transportation vehicle of claim 1, wherein the first information identifies a category, an identifier and/or a lane of a road to which the hazard relates.

10. The transportation vehicle of claim 1, further comprising:

comparing an expected geolocation of the second transportation vehicle with the first geolocation; and transmitting the forwarded message in response to the expected geolocation being within a predefined radius around the first geolocation.

11. The method of claim 10, wherein the second message comprises at least one of:

information on the expected geolocation, information on the current geolocation and a current direction, and route information.

12. A method of a first transportation vehicle for vehicle-to-vehicle (V2V) communication, the method comprising:

receiving a first message from a remote transmitter comprising first information on a hazard related to a first geolocation indicated in the first message, the first information designating a relevant area associated with the hazard, wherein the relevant area is defined based on one or more lanes affected by the hazard and a type of road associated with the one or more lanes;

determining second information on a second transportation vehicle; and comparing the first information and the second information and selectively transmitting a forwarded message based on the content of the first message to the second transportation vehicle based on the comparison of the first and the second information, wherein the second information relates to a current geolocation of the second transportation vehicle;

comparing the current geolocation with a broadcast radius of the remote transmitter; and transmitting the forwarded message in response to the current geolocation being outside the broadcast radius.

13. The method of claim 12, wherein the second information on the second transportation vehicle are determined based on at least sensor value obtained by the first transportation vehicle, or comprises in a second message received from the second transportation vehicle.

14. The method of claim 12, wherein the broadcast radius is determined based on:

information transmitted by the remote transmitter in the first message;

a predetermined information; or a signal strength of the first message determined by the first transportation vehicle.

15. The method of claim 12, wherein the method further comprises, in response to the current geolocation being within the broadcast radius, refraining from the selective transmission of the forwarded message.

16. The method of claim 12, wherein the first information further comprises an identification of time associated with the hazard, and the method further comprises:

comparing a current time with the identified time; and transmitting the forwarded message in response to a difference between the current time and the identified time being less than a certain threshold.

17. The method of claim 12, wherein the first information includes an identification of a category of the hazard, and the method further comprises:

comparing a category of hazard with the second information; and transmitting the forwarded message in response to the category of hazard affecting the second transportation vehicle.

18. The method of claim 12, wherein the relevant area is defined by a radius from the first geolocation.

19. The method of claim 12, wherein the first information identifies a direction of movement.

20. The method of claim 12, wherein the first information identifies a category, an identifier and/or a lane of a road to which the hazard relates.

21. The method of claim 12, further comprising:

comparing an expected geolocation of the second transportation vehicle with the first geolocation; and transmitting the forwarded message in response to the expected geolocation being within a predefined radius around the first geolocation.

22. The method of claim 21, wherein the second message comprises at least one of:

information on the expected geolocation, information on the current geolocation and a current direction, and route information.

23. A non-transitory computer readable medium including a computer program comprising instructions which, when the program is executed by a control unit of a transportation vehicle, cause the control unit to perform the method of claim 12.

* * * * *